United States Patent
Arimilli et al.

[11] Patent Number: 5,943,684
[45] Date of Patent: Aug. 24, 1999

[54] METHOD AND SYSTEM OF PROVIDING A CACHE-COHERENCY PROTOCOL FOR MAINTAINING CACHE COHERENCY WITHIN A MULTIPROCESSOR DATA-PROCESSING SYSTEM

[75] Inventors: Ravi Kumar Arimilli, Austin; John Steven Dodson, Pflugerville, both of Tex.

[73] Assignee: International Business Machines Corporation, Armonk, N.Y.

[21] Appl. No.: 08/839,543

[22] Filed: Apr. 14, 1997

[51] Int. Cl.[6] ........................................ G06F 12/00
[52] U.S. Cl. ........................ 711/144; 711/141; 711/145
[58] Field of Search .................................. 711/141, 142, 711/143, 144, 145, 146

[56] References Cited

U.S. PATENT DOCUMENTS

| | | | |
|---|---|---|---|
| 4,648,030 | 3/1987 | Bomba et al. | 711/141 |
| 5,369,753 | 11/1994 | Tipley | 711/122 |
| 5,375,216 | 12/1994 | Moyer et al. | 711/123 |
| 5,671,391 | 9/1997 | Knotts | 711/143 |
| 5,680,576 | 10/1997 | Laudon | 711/145 |
| 5,715,428 | 2/1998 | Wang et al. | 711/141 |
| 5,721,867 | 2/1998 | Kuttanna et al. | 711/141 |
| 5,737,568 | 4/1998 | Hamaguchi et al. | 711/121 |
| 5,802,572 | 9/1998 | Patel et al. | 711/143 |
| 5,809,560 | 9/1998 | Schneider | 711/204 |

OTHER PUBLICATIONS

Jim Handy, "The Cache Memory Book" Academic Press, ISBN 0-12-322985-5, pp. 102, 143-190, 246, 251, 1993.

*Primary Examiner*—Tod R. Swann
*Assistant Examiner*—Felix B. Lee
*Attorney, Agent, or Firm*—Richard A. Henkler; Anthony P. Ng; Andrew J. Dillon

[57] ABSTRACT

A method and system of providing a cache-coherency protocol for maintaining cache coherency within a multiprocessor data-processing system is disclosed. In accordance with the method and system of the present invention, each processor has a cache hierarchy of at least a first-level cache and a second-level cache, and the first-level cache is upstream of the second-level cache. Each of the caches includes multiple cache lines, each associated to a state-bit field utilized for identifying at least six different states of the cache lines, including a Modified state, an Exclusive state, a Shared state, an Invalid state, a Recently-Read state, and an Upstream-Undefined state. In response to an indication of a cache line containing a copy of information that was most recently accessed, the state of the cache line is transitioned from the Invalid state to the Recently-Read state. In response to an information modification of a cache line in the first-level cache without performing a linefill operation, the state of the cache line is transitioned from the Invalid state to the Upstream-Undefined state.

15 Claims, 2 Drawing Sheets

METHOD AND SYSTEM OF PROVIDING A CACHE-COHERENCY PROTOCOL FOR MAINTAINING CACHE COHERENCY WITHIN A MULTIPROCESSOR DATA-PROCESSING SYSTEM

CROSS-REFERENCE TO RELATED PATENT APPLICATIONS

The present invention is related to the subject matter of co-pending United States Patent Applications entitled "Cache-Coherency Protocol With Recently Read State for Instructions," filed Apr. 14, 1997, Ser. No. 08/839,549 (IBM Docket No. AT9-97-152) and "Cache-Coherency Protocol With Upstream Undefined State," filed Apr. 14, 1997, Ser. No. 08/839,545 (IBM Docket No. AT9-97-161), both assigned to the assignee herein named. The contents of both above-mentioned co-pending patent applications are incorporated by reference herein.

BACKGROUND OF THE INVENTION

1. Technical Field

The present invention relates to a method and system for maintaining cache coherency in general and, in particular, to a method and system for maintaining cache coherency within a data-processing system. Still more particularly, the present invention relates to a method and system of providing a cache-coherency protocol for maintaining cache coherency within a multiprocessor data-processing system.

2. Description of the Prior Art

In a symmetric multiprocessor (SMP) data-processing system, all of the processing units are generally identical; that is, they all utilize a common set or subset of instructions and protocols to operate and, generally, have the same architecture. Each processing unit includes a processor core having multiple registers and execution units for carrying out program instructions. Each processing unit may also have one or more primary caches (i.e., level one, L1, caches), such as an instruction cache and/or a data cache, which are implemented utilizing high-speed memories. In addition, each processing unit may also include additional caches, typically referred to as a secondary cache or level two (L2) cache for supporting the primary caches such as those mentioned above.

Within an SMP environment, it is important to provide a memory-coherency scheme, such that read or write operations to each individual memory location are serialized in some order for all processors. In other words, all processing units will observe the read or write operation to a given memory location in a given order.

As for the caches, there are a number of protocols and techniques for achieving cache coherency that are well-known to those skilled in the art. Not surprisingly, all these protocols grant only one processing unit the "permission" to write to a cache line at any given point in time. As a consequence of this requirement, whenever a processing unit attempts to write to a cache line, it must first inform all other processing units of its desire to write to the cache line and receive permission from all other processing units before carrying out the write operation.

In order to achieve communications among various processing units, a requesting processing unit must pass messages over the interconnect (such as a bus) indicating its desire to read or write cache line. When the request is placed on the interconnect, all of the other processing units "snoop" (or monitor) this operation and decide if the state of their caches can allow the requested operation to proceed and, if so, under what conditions. There are several bus transactions that require snooping and follow-up action to honor the bus transactions and maintain cache coherency. The snooping operation is triggered by the receipt of a qualified snoop request, generated by the assertion of certain bus signals. Instruction processing is interrupted only when a snoop hit occurs and a snoop state machine determines whether or not an additional cache snoop is required to resolve the coherency of the offended cache line.

This kind of communication is required because the most recent, valid copy of information may have been moved from the system memory to one or more of the caches within the system. In fact, the correct version of the information may be in either the system memory or one of the caches within the system, or both. Thus, if the correct version is in one or more of the other caches within the system, it is important to obtain the correct value from the cache(s) rather than the system memory.

In order to achieve cache coherency within the system, a state-bit field is utilized to indicate the current "state" of a cache line. This state information is then utilized to allow certain optimization in the cache-coherency protocol for reducing message traffic on the generalized interconnect and the inter-cache connections. As one example of this mechanism, when a processing unit executes a read, it receives a message indicating whether or not the read must be retried later. If the read operation is not retried, the message usually also includes information allowing the processing unit to determine if any other processing unit also has a valid and active copy of the information (this is accomplished by having the other lowest-level caches give a "shared" or "not shared" indication for any read they do not retry). Therefore, a processing unit can determine whether or not any other processing unit in the system has a copy of the information. If no other processing unit has an active copy of the information, the reading processing unit marks the state-bit field of the cache line as Exclusive. If a cache line is marked as Exclusive, it is permissible to allow the processing unit later to write the cache line without first communicating with other processing units in the system, because no other processing unit has a copy of the same information. Therefore, it is possible for a processing unit to read or write a cache line without first communicating this intention via the interconnect, but only when the coherency protocol has ensured that no other processing unit has an interest in the same information.

A further improvement in accessing cache blocks can be achieved by utilizing a procedure known as "intervention." An intervention procedure allows a cache to have control over a memory block for providing the data or instruction in that block directly to another cache requesting the value (for a read-type operation). In other words, the intervention procedure bypasses the need to first write the data or instruction to the system memory and then have the requesting processing unit read it back again from the system memory. An intervention can only be performed by a cache having the value in a cache line whose state is Modified or Exclusive. In both of these states, there is only one cache line that has a valid copy of the value, so it is a simple matter to source the value over the bus without the necessity of first writing it to the system memory. The intervention procedure thus speeds up processing by avoiding the longer process of writing to and reading from the system memory (which typically requires three bus operations and two memory operations). Hence, the intervention procedure not only results in better latency, it also increases bus bandwidth.

Prior-art cache-coherency protocols do not provide for intervention when data or instructions are held in Shared states by two or more caches because, generally, it is difficult to determine which cache would source the information. Intervention with Shared cache states can be provided if a system collects all of the Shared responses and then selects (e.g., arbitrarily) which cache should source the information. This approach, however, is no faster than first writing and then reading from the system memory, and so it provides no benefit. Also, because instructions (as opposed to data) are never written, the state of any cache block containing a valid instruction is always Shared, and so instructions cannot be sourced by way of intervention.

Consequently, it would be desirable to devise an improved cache-coherency protocol for maintaining cache coherency which allowed for efficient intervention of data with Shared states. Further, it would also be desirable that such an improved cache-coherency protocol provides indication that a cache line is allocated and valid upstream of a given cache level, while undefined at that level, in order to avoid unnecessary bus operations for a sectored cache.

SUMMARY OF THE INVENTION

In view of the foregoing, it is therefore an object of the present invention to provide an improved method and system for maintaining cache coherency.

It is another object of the present invention to provide an improved method and system for maintaining cache coherency within a data-processing system.

It is yet another object of the present invention to provide an improved method and system of providing a cache-coherency protocol for maintaining cache coherency within a multiprocessor data-processing system.

In accordance with the method and system of the present invention, each processor has a cache hierarchy of at least a first-level cache and a second-level cache, and the first-level cache is upstream of the second-level cache. Each of the caches includes multiple cache lines, each associated to a state-bit field utilized for identifying at least six different states of the cache lines, including a Modified state, an Exclusive state, a Shared state, an Invalid state, a Recently-Read state, and an Upstream-Undefined state. In response to an indication of a cache line containing a copy of information that was most recently accessed, the state of the cache line is transitioned from the Invalid state to the Recently-Read state. In response to an information modification of a cache line in the first-level cache without performing a linefill operation, the state of the cache line is transitioned from the Invalid state to the Upstream-Undefined state.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be implemented in any data-processing system having a cache memory. Also, it is understood that the features of the present invention may be applicable in various data-processing systems having a primary cache and a secondary cache.

Figure 1:
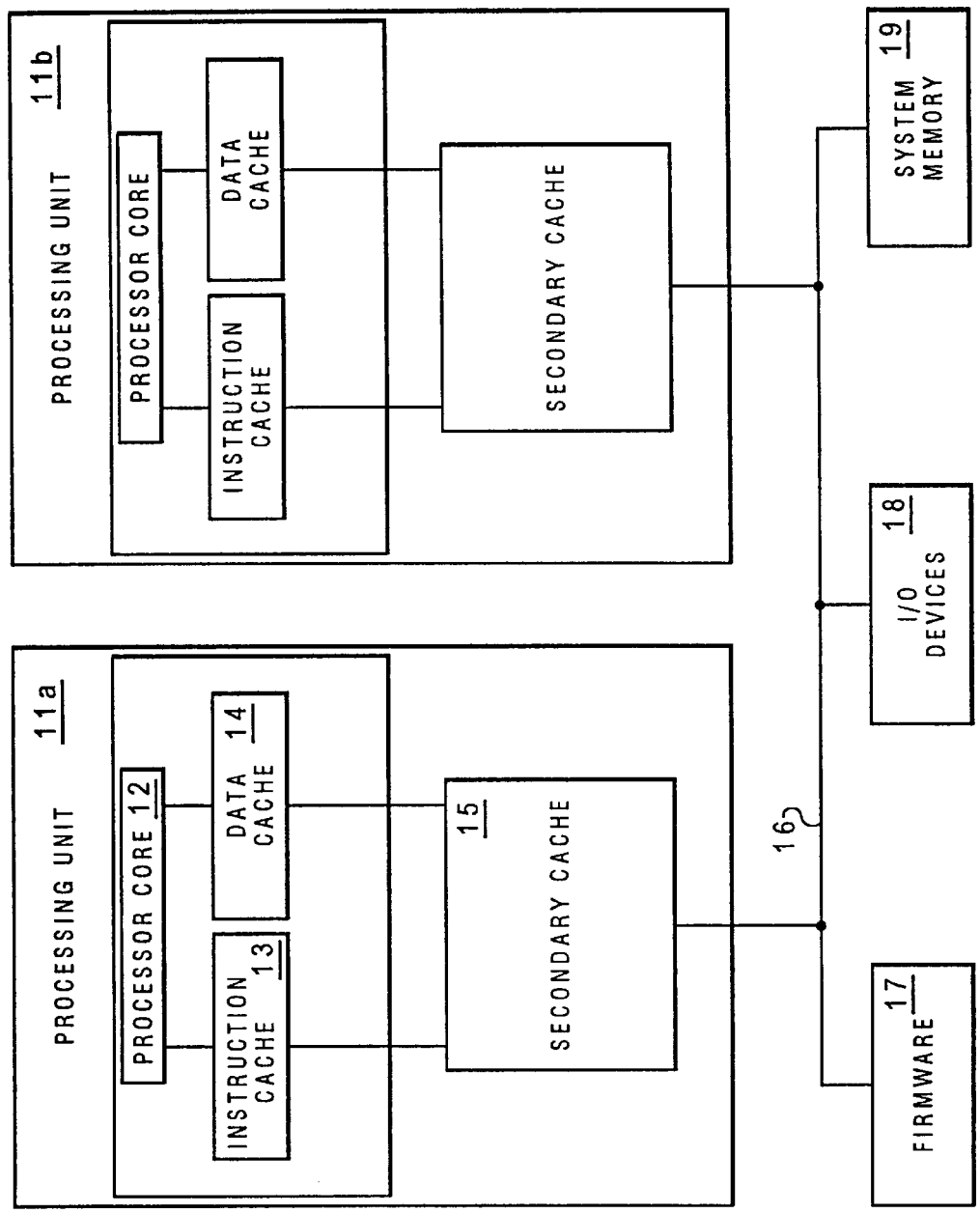
FIG. 1 is a block diagram of a multiprocessor data-processing system in which the present invention is applicable.

Referring now to the drawings and, in particular, to FIG. 1, there is depicted a block diagram of a multi-processor data-processing system 10 in which the present invention is applicable. Multiprocessor data-processing system 10 has several processing units, two of which are depicted. Each of processing units 11a, 11b may include a processor core 12, an on-chip instruction cache 13, an on-chip data cache 14, and a secondary cache 15. Each of processing units 11a, 11b is also connected to various peripheral devices, including input/output devices 18, system memory 19, and firmware 17 whose primary purpose is to seek out and load an operating system from one of the peripherals during initial program load. Processing units 11a and 11b may communicate with these peripheral devices via various means, including a bus 16. Those skilled in the art will further appreciate that system 10 may have many additional components that are not shown, such as serial and parallel ports for connection to peripherals such as modems or printers.

Figure 2:
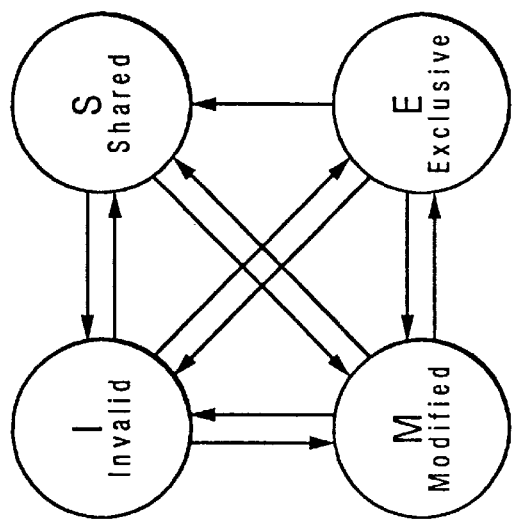
FIG. 2 is a state diagram depicting a cache-coherency protocol for a multiprocessor data-processing system, under the prior art.

With reference now to FIG. 2, there is illustrated a state diagram depicting a cache-coherency protocol for a multiprocessor data-processing system, under the prior art. Under this prior-art "MESI" protocol, a cache line can be in one of the four following states, namely, Modified (M), Exclusive (E), Shared (S), or Invalid (I). Each cache line generally has two state bits to indicate one of the above four states. Depending upon the initial state of the entry and the type of access sought by the requesting processor, the state may be changed, and a particular state is set for the entry in the cache line of the requesting processor. For example, when a cache line is in a Modified state, the addressed line is valid only in the cache having the modified cache line within the data-processing system, and the modified value has not been written back to the system memory. When a cache line is in an Exclusive state, it is present only in the noted cache line, and the value is consistent with that in the system memory. If a cache line is in a Shared state, the cache line is valid in that cache and in at least one other cache within the data-processing system. The value is a shared cache line is consistent with that in the system memory. Finally, when a cache line is in an Invalid state, it indicates that the addressed memory location is not resident in the cache. If a cache line is in any of the Modified, Exclusive, Shared, or Invalid states, it can move among various states depending upon the particular bus transaction as depicted in FIG. 2. For example, while a cache line in an Exclusive state can move to any one of the other three states, a cache line can only become Exclusive from the Invalid state or the Modified state.

Figure 3:
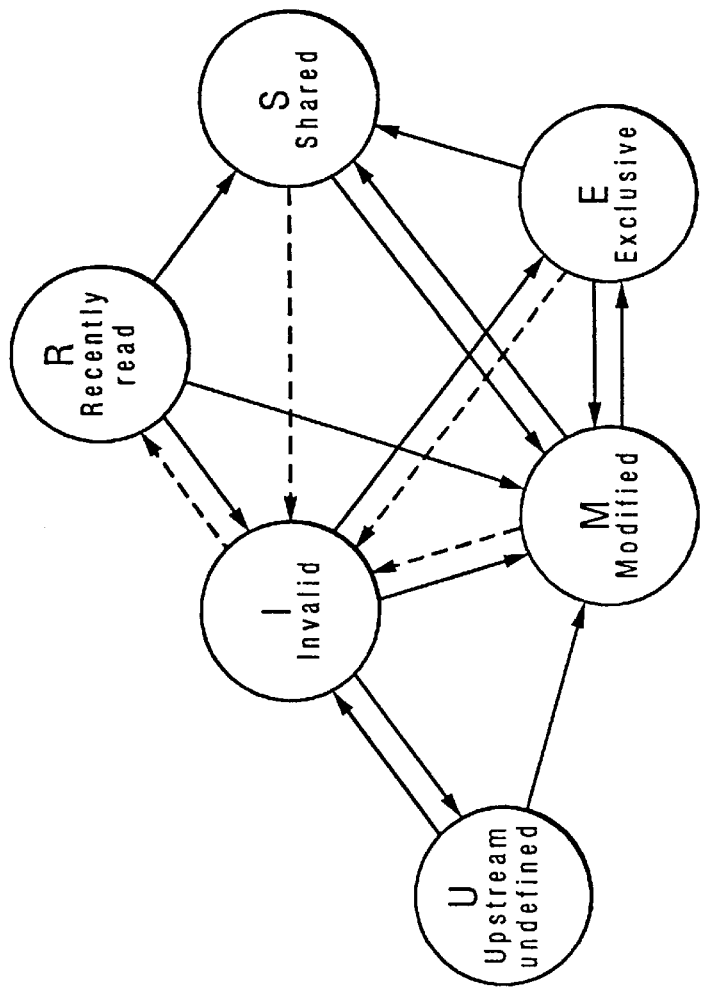
FIG. 3 is a state diagram depicting a cache-coherency protocol for a multiprocessor data-processing system, in accordance with a preferred embodiment of the present invention.

Referring now to FIG. 3, there is depicted a state diagram depicting a cache-coherency protocol for a multiprocessor data-processing system, in accordance with a preferred embodiment of the present invention. This protocol is similar to the prior-art MESI protocol of FIG. 2 in that it includes the same four states—Modified, Exclusive, Shared and Invalid, but it further includes two new states—Recently-Read (R) and Upstream-Undefined (U).

I. Recently-Read State

The Recently-Read state is utilized to provide an indication of the most recently referenced block that would otherwise be in a Shared state. In other words, when each of two or more caches hold valid a copy of an instruction, all of the cache are in the Shared state except for the cache that has been accessed recently. That most recently accessed cache will be in the Recently-Read state.

As with the prior-art MESI protocol, the four M-E-S-I states may change based on the initial state of the entry and the type of access sought by the requesting processor. The manner in which these four states change is generally identical to the prior-art MESI protocol, with the exceptions noted below.

Table I shows the master cache state transitions for read-type operations, where a "miss" occurs:

TABLE I

| | Bus Operation | Master State | Coherency Response |
|---|---|---|---|
| 1 | Read | I → R | ShrI, Shr, or Mod |
| 2 | RWITM | I → M | ShrI, Shr, Mod, or Null |
| 3 | Read | I → E | Null |

The Recently-Read state will be entered because of a "Read miss" bus operation (first row of Table I), when the coherency response is Shared-Intervention (ShrI), Shared (Shr), or Modified (Mod). If the coherency response is Modified on a "Read miss" operation, the modified cache will send the instruction to the system memory also, so it is no longer Modified. In a Read With Intent To Modify (RWITM) "miss" situation, the Modified state will be entered if the coherency response is ShrI, Shr, Mod, or Null (the second row of Table I). The RWITM cases apply only to data, not instructions, because instructions typically are not modified. If there is no coherency response (Null) on a "Read miss" operation (third row of Table I), then the Exclusive state will be entered as in the prior-art MESI protocol.

Table II shows an example of how the bus transactions influence the cache when acting as a snooper, for read-type operations:

TABLE II

| | Bus Operation | Snooper State | Coherency Response |
|---|---|---|---|
| 1 | Read-Burst | R → S | ShrI |
| 2 | Read-Burst | E → S | ShrI |
| 3 | Read-Burst | M → S | Mod |
| 4 | RWITM | E or R → I | ShrI |
| 5 | RWITM | M → I | Mod |

For either an Exclusive or Recent beginning state (first, second, and fourth rows of Table II), the cache will transmit a Shared-Intervention coherency response, meaning that it will source its copy of instruction via an intervention procedure (i.e., directly to the requesting processor, without involvement from the system memory). Whenever an instruction is sourced, the next state becomes Shared for a Read "hit" situation (first and second rows of Table II) or Invalid for an "RWITM hit" operation (fourth row of Table II). In those cases where the beginning state is Modified (third and fifth rows of Table II), which again do not apply in the case of instructions because program instructions are typically not modified. For the coherency response will be Modified, and intervention will still occur if the bus operation was an "RWITM." In other words, data in a cache block is written to the system memory and read therefrom by the requesting processor only for the case illustrated in the third row of Table II.

As noted above, for those states and operations not shown in Tables I and II, transitions and coherency responses are performed in accordance with the prior-art MESI protocol with one qualification. Namely, a cache entry can have a Recently-Read state which is subjected to a write operation, and that entry will undergo a transition to a Modified state in a manner similar to that occurring when a Shared entry is subjected to a write operation.

Furthermore, an entry can never go from an Invalid state to a Shared state (it would go to Recent-Read state instead). An entry can never go from an Exclusive state to a Recently-Read state (it would go to Shared state). An entry can never go from a Recently-Read state to an Exclusive state (just as a Shared entry cannot go to Exclusive). Finally, an entry can never go from a Modified state to a Recently-Read state (it would go to Shared state, while entry in the cache of the requesting processor would go to Recently-Read).

With this Recently-Read state, the ownership of a block migrates to the last cache to read the instruction, which has the added benefit of staying most recently used and thereby lessening the chance of de-allocation if a least recently used (LRU) cache replacement scheme is employed. The Recently-Read state can also be advantageously utilized for other applications, such as an intelligent input/output (I/O) controller interrupting the processor/cache which has most recently read a cached I/O status location, because this processor/cache would be most likely to have cached the I/O device driver code and, therefore, could execute the code faster than in another processor that needs to fetch the code into its cache.

II. Upstream-Undefined State

A higher-level cache, such as L1, may want to modify its data in a cache line (by zeroing) without first fetching the relevant old data from the system memory. This operation is commonly performed when reallocating memory areas to a new process. In response, a lower-level cache also needs to allocate and zero a corresponding cache line. The conventional method of implementing this procedure is to read the cache line from the system memory and then zero out the portion corresponded to the cache line in the higher-level cache. Needless to say, this approach defeats the entire purpose of the operation, which is to avoid reading data from the system memory that is going to be reallocated anyway. Furthermore, it is likely that the processor will, in a very short time span, allocate-and-zero additional cache lines which would fall into the remaining portion of the cache line in the lower-level cache (although a lower-level cache cannot assume this to be the case). Thus, the first problem is to keep track of sectors that are valid in the higher-level cache but are not yet valid in lower-level cache(s).

In a sectored-cache having, for example two sectors, there are three Upstream-Undefined states due to three possible cases, as follows: (1) the first of the two sectors (the "odd" sector) is modified; (2) the second of the two sectors (the "even" sector) is modified; and (3) neither of the sectors is modified (they are both shared as a result of a cachable write-through operation). The first of these states is referred to herein as "$U_{IM}$," while the second of these states is referred to herein as "$U_{MI}$," and the third of these states is referred to herein as "$U_{SS}$." In this two-sectored cache example, each cache line may have three bits which indicate the state of the line. If more than two sectors were provided in a cache line, then additional bits in the cache line will be required for the additional states.

Table III shows the cache transitions involving operations in the higher-level cache (L1):

TABLE III

| | Highest-Level (L1) Operation | Lower-Level Cache Transition |
|---|---|---|
| 1 | DCBZ-even sector | I → $U_{IM}$ |
| 2 | DCBZ-odd sector | I → $U_{MI}$ |
| 3 | DCBZ-even sector | $U_{IM}$ → M |
| 4 | DCBZ-odd sector | $U_{MI}$ → M |
| 5 | Read/RWITM | $U_{MI}|U_{IM}$ → I |
| 6 | Any L1 "hit" | $U_{SS}$ → $U_{SS}$ |
| 7 | Cachable write-through | I → $U_{SS}$ |
| 8 | Any other operation | normal MESI |

In the first of the entries in Table III, when an allocate-and-zero operation (DCBZ), a write-type operation, is performed on an even sector (the second sector) within a cache line of the L1 cache, any corresponding lower-level caches in an Invalid state will undergo a transition to an "$U_{IM}$" state, i.e., only the second sector is noted as being modified. In the second entry in Table III, when a DCBZ operation is performed on an odd sector (the first sector) within a cache line of the L1 cache, any corresponding lower-level caches in an Invalid state will undergo a transition an "$U_{MI}$" state, i.e., only the first sector is noted as being modified.

If a DCBZ operation is performed on an even sector when the odd sector of the same cache line has previously undergone a DCBZ operation and the corresponding lower-level caches are in the "$U_{MI}$" state (the fourth entry in Table III), or if a DCBZ operation is performed on an odd sector when the even sector of the same line has previously undergone a DCBZ operation and the corresponding lower-level caches are in the "$U_{IM}$" state (the fourth entry in Table III), then the lower-level caches will undergo a state transition to a Modified state to indicate that the entire line is modified. If, however, only one DCBZ operation has previously occurred for a given line and the lower-level caches have that line at "$U_{IM}$" state or "$U_{MI}$" state, and the other Invalid line is the subject of a "read" or "read with intent to modify" (RWITM) operation, then the lower-level cache lines go to an Invalid state, and the modified sector is flushed from the higher-level cache.

In the sixth entry of Table III, if an L1 "hit" occurs against the subject block, and the lower-level caches are in an "$U_{SS}$" state, they will remain in that state, i.e., it is treated as if it were valid, but not cached. If a cachable/write-through read operation is performed on the block (the seventh entry in Table III), and the lower-level caches have the corresponding block in an Invalid state, then they undergo a transition to an "$U_{SS}$" state. Finally, as noted in the eighth entry of Table III, all other L1 operations not specified above undergo a normal transition, i.e., according to the prior-art MESI protocol.

Table IV shows how system bus snooped transactions will influence caches in one of the Upstream-Undefined states:

TABLE IV

| | Bus operation | Snooper state | Coherency response |
|---|---|---|---|
| 1 | Any snoop "hit" | $U_{IM}$ → I | Retry |
| 2 | Any snoop "hit" | $U_{MI}$ → I | Retry |
| 3 | Non-read snoop "hit" | $U_{SS}$ → I | Retry |
| 4 | Read snoop "hit" | $U_{SS}$ → $U_{SS}$ | Shared |

When in one of the Upstream-Undefined states, the cache knows that it must take action and needs to forward the snoop upstream to determine the proper action. Table IV shows only those rare cases where a snoop hit occurs against one of the Upstream-Undefined states. In these situations, the lower-level cache will flush the contents of the upstream cache and move to an Invalid state and issue a "Retry" response, except where a read snoop hit occurs against a "$U_{SS}$" state, in which the coherency response is Shared.

With the foregoing Upstream-Undefined states, both of the above-mentioned problems related to keeping track of sectors that are valid in higher-level caches without executing unnecessary bus operations and efficiently supporting cachable write-through operations are resolved. The results are increased memory bandwidth and the freeing up of address bandwidth, as well as byte-write capability. Note that only one Upstream-Undefined state is depicted in FIG. 3 for the sake of simplicity, it is understood by those skilled in the art that the number of Upstream-Undefined states depends on the number of sectors within a cache line.

As has been described, the present invention provides an improved method of providing a cache-coherency protocol for maintaining cache coherency within a multiprocessor data-processing system.

While the invention has been particularly shown and described with reference to a preferred embodiment, it will be understood by those skilled in the art that various changes in form and detail may be made therein without departing from the spirit and scope of the invention.

What is claimed is:

1. A method of providing a cache-coherency protocol for maintaining cache coherency within a multiprocessor data-processing system, each processor within said multiprocessor data-processing system having a cache hierarchy of at least a first-level cache and a second-level cache, wherein said first-level cache is upstream of said second-level cache and each of said caches includes a plurality of cache lines, said method comprising the steps of:

associating a state-bit field with each of said plurality of cache lines, wherein said state bit field is utilized to identify a plurality of states, including a Modified state, an Exclusive state, a Shared state, an Invalid state, a Recently-Read state, and an Upstream-Undefined state;

in response to an indication that a cache line contains a copy of information that was most recently read, transitioning an associated state-bit field from said Invalid state to said Recently-Read state; and in response to an information modification in a cache line in said first-level cache without performing a linefill operation, transitioning an associated state-bit field from said Invalid state to said Upstream-Undefined state.

2. The method according to claim 1, wherein said method further includes a step of transitioning an associated state-bit field from said Recently-Read state to said Invalid state.

3. The method according to claim 1, wherein said method further includes a step of transitioning an associated state-bit field from said Recently-Read state to said Modified state.

4. The method according to claim 1, wherein said method further includes a step of transitioning an associated state-bit field from said Recently-Read state to said Shared state.

5. The method according to claim 1, wherein said method further includes a step of transitioning an associated state-bit field from said Modified state to said Shared state.

6. A cache memory having a cache-coherency protocol for maintaining cache coherency within a multiprocessor data-processing system, each processor within said multiprocessor data-processing system having a cache hierarchy of at least a first-level cache and a second-level cache, wherein said first-level cache is upstream of said second-level cache, said cache memory comprising:

a plurality of cache lines;

a state-bit field associated with each of said plurality of cache lines, said state bit field is utilized to identify a plurality of states, including a Modified state, an Exclusive state, a Shared state, an Invalid state, a Recently-Read state, and an Upstream-Undefined state;

means for transitioning an associated state-bit field from said Invalid state to said Recently-Read state, in response to an indication that a cache line contains a copy of information that was most recently read; and means for transitioning an associated state-bit field from said Invalid state to said Upstream-Undefined state, in response to an information modification in a cache line in said first-level cache without performing a linefill operation.

7. The cache memory according to claim 6, wherein said cache memory further includes a mean for transitioning an associated state-bit field from said Recently-Read state to said Invalid state.

8. The cache memory according to claim 6, wherein said cache memory further includes a means for transitioning an associated state-bit field from said Recently-Read state to said Modified state.

9. The cache memory according to claim 6, wherein said cache memory further includes a means for transitioning an associated state-bit field from said Recently-Read state to said Shared state.

10. The cache memory according to claim 6, wherein said cache memory further includes a means for transitioning an associated state-bit field from said Modified state to said Shared state.

11. A multiprocessor data-processing system comprising:

a plurality of processing units;

a system memory coupled to said plurality of processing units;

a first-level cache memory included within each of said plurality of processing units;

a plurality of second-level cache memories, wherein each of said plurality of second-level cache memories is associated one of said first-level cache memory, wherein said first-level cache is upstream of said second-level cache;

wherein each of said cache memories having a cache-coherency protocol for maintaining cache coherency, further includes:

a plurality of cache lines;

a state-bit field associated with each of said plurality of cache lines, said state bit field is utilized to identify a plurality of states, including a Modified state, an Exclusive state, a Shared state, an Invalid state, a Recently-Read state, and an Upstream-Undefined state;

means for transitioning an associated state-bit field from said Invalid state to said Recently-Read state, in response to an indication that a cache line containing a copy of information that was most recently read; and means for transitioning an associated state-bit field from said Invalid state to said Upstream-Undefined state, in response to an information modification in a cache line in said first-level cache without performing a linefill operation.

12. The multiprocessor data-processing system according to claim 11, wherein each of said cache memories further includes a means for transitioning an associated state-bit field from said Recently-Read state to said Invalid state.

13. The multiprocessor data-processing system according to claim 11, wherein each of said cache memories further includes a means for transitioning an associated state-bit field from said Recently-Read state to said Modified state.

14. The multiprocessor data-processing system according to claim 11, wherein each of said cache memories further includes a means for transitioning an associated state-bit field from said Recently-Read state to said Shared state.

15. The multiprocessor data-processing system according to claim 11, wherein each of said cache memories further includes a means for transitioning an associated state-bit field from said Modified state to said Shared state.

* * * * *